United States Patent [19]

Pfister

[11] Patent Number: 4,492,905

[45] Date of Patent: Jan. 8, 1985

[54] INTERMITTENT DRIVE ARRANGEMENT

[76] Inventor: Jean-Francois Pfister, Rue du Soleil 10, CH-2605 Sonceboz, Switzerland

[21] Appl. No.: 472,291

[22] Filed: Mar. 4, 1983

Related U.S. Application Data

[63] Continuation-in-part of Ser. No. 200,868, Oct. 27, 1980, abandoned.

[30] Foreign Application Priority Data

Oct. 31, 1979 [FR] France ............................... 79 27047

[51] Int. Cl.³ .............................................. G05B 5/00
[52] U.S. Cl. ................................... 318/470; 318/265; 318/466
[58] Field of Search ............... 318/445, 466, 470, 265, 318/264; 368/28, 201, 217–219, 200, 202, 85–87

[56] References Cited

U.S. PATENT DOCUMENTS

| | | | |
|---|---|---|---|
| 3,617,837 | 11/1971 | Beck | 318/470 X |
| 3,855,781 | 12/1974 | Chibara et al. | 368/28 |
| 3,916,612 | 11/1975 | Morokawa et al. | 368/201 |
| 4,176,517 | 12/1979 | Yoshida | 368/201 |

Primary Examiner—Ulysses Weldon
Attorney, Agent, or Firm—Pollock, Vande Sande and Priddy

[57] ABSTRACT

In order to obtain very long operating autonomy without maintenance, with low power consumption and low wear and tear, both the energizing and de-energizing of a DC motor are controlled by an electronic switching circuit providing bounce-free switching. A switching-on control circuit actuates the switching circuit, causing it to energize the motor. A switching-off control device, comprising a rotary component connected to the motor shaft and including contact elements responsive to the position of the rotary component, actuates the switching circuit to cut off the power supply to the motor after the rotary component has rotated through a predetermined angle. The arrangement is advantageous for driving apparatus which is not easily accessible and lacks reliable mains power. Another useful particularity consists in a multiple plug device whereby the rate of intermittent driving may be varied within the range of 1 day to 31 days.

9 Claims, 8 Drawing Figures

INTERMITTENT DRIVE ARRANGEMENT

CROSS REFERENCE TO RELATED APPLICATION

This is a continuation-in-part of copending application Ser. No. 200868, filed Oct. 27, 1980 (Priority: France, Oct. 31, 1979), now abandoned.

BACKGROUND OF THE INVENTION

This invention relates to systems for driving apparatus intermittently, and more particularly to an arrangement for driving apparatus which needs now driven intermittently but reliably with a specific mechanical torque during a long period of time without maintenance.

Such drive arrangements are used especially in connection with monitoring apparatus intended to record various data such as parameters in the fields of engineering (mechanical stresses in bridges, tunnels, and other structures), utilities (flow-rates in mains and pipelines), or meteorology (air and water pollution, radiation, insolation, etc). Intermittent drive arrangements also have many other kinds of applications in the most varied fields.

One of the important requirements which have to be met by such drive arrangements is great adaptability. Due to the large variety of different uses of the apparatus, the rate of intermittency of driving (typically of driving the motor of a monitoring apparatus) might have to be one driving operation per minute, or per hour, or per day; it may also be necessary to have two driving operations per day, or one operation every two days or every week or every two weeks, or even one driving operation after a lapse of 31 days (monthly monitoring) etc. If only for the manufacture of the driving system, it is important that just one type of apparatus need be built and that the particular rates of intermittency desired can then be set by means of a very simple operation. Also for systems already in operation, it is very desirable for the person responsible for maintenance of the system to be able to change the rate of intermittency by a very simple operation and by means of equipment which is light and easily portable.

Another of the essential requirements to be met by such drive arrangements is that of long-term autonomy, for the apparatus they drive are often installed in large numbers at locations which are not easily accessible; either they are read only infrequently, or the readings are transmitted by radio to central stations. In any case, such apparatus must be capable of operating for a very long time (at least several years, even up to ten years) without requiring any maintenance. Since this equipment is often situated far from the power mains, it is fed by cells, groups of cells, or storage batteries having a large capacity and great reliability.

In order for such apparatus to operate properly, moreover, the intermittent drive arrangement must furnish a certain mechanical torque which is substantially higher than what suffices to move simple needles or pointers, for instance.

Furthermore, the requirement of adaptability, as mentioned above, is essential, first, in order to have avantageous manufacturing conditions (only one basic type to manufacture) and, second, in order to be able easily to change the rate of intermittency of apparatus already in service.

In order to achieve the aforementioned long-term reliability, one problem which must be solved, and which can be solved with present-day technology, is that of providing the apparatus with adequate, very reliable, and very long-life energy sources. In addition, however, there are two other particular problems to be solved: one relating to the energy consumption, which must be very low, meaning that high efficiency is called for; and the other relating to the need for a virtual lack of wear and tear on the various moving parts in the drive arrangement. Both of these problems have essentially to do with the type of motor used in the intermittent drive arrangement.

There is a known type of electric motor which is capable of rendering the desired service and which is distinguished by extremely low wear and tear, allowing it to operate intermittently for a number of years (up to ten years) without any maintenance. This is the stepping motor. The use of a stepping motor in a drive arrangement of the aforementioned kind therefore provides a good solution to the second of the two particular problems cited above, encoutered in satisfying the essential requirement discussed earlier. Unfortunately, the stepping motor does not furnish any solution to the first of those two problems, namely, that of very low energy consumption, i.e., high efficiency. The fact is that in a stepping motor, the electrical pulse conditions are fixed and must be such that sufficient energy is supplied to the motor at each step, taking into account the most severe conditions of moment of resistance that may be encountered. Even when the actual moment of resistance is much lower, each step of the motor uses the same amount of energy, predetermined to ensure that the motor will advance even under unfavorable conditions. Consequently, it turns out that when the mechanical power furnished (considering the necessary mechanical torque mentioned above) is compared with the actual expenditure of electrical energy, the results are far from excellent. Thus, the use of a stepping motor means that the capacity of the energy source must be considerably overdimensioned, and this is not possible without major drawbacks from the point of view of expense and space requirements.

There is another type of motor, known for its particularly high efficiency, which might be considered for use, namely, the DC motor; for besides being highly efficient, it has the advantage of automatically adapting its power consumption to the torque required. Thus, the use of a DC motor seems to solve the first of the two particular problems mentioned, but it runs into difficulties concerning the solution to the second of those problems, viz., the necessity for low wear and tear. When a small DC motor is operating continuously, it may be expected to run reliably for about 2,000 hours, or 3,000 hours for very high-quality motors. Beyond that, the motor will not operate reliably without maintenance, particularly including thorough cleaning or replacement of the commutator and brushes. Nevertheless, theoretical considerations lead to the belief that for intermittent operation, a DC-motor might be used for a number of years without maintenance. If, for example, the motor is assumed to operate for a total of two seconds per minute (e.g., about 30 ms per second), the ratio of running time to total time elapsed is 1:30; hence it might be thought that the time during which such a motor can operate without maintenance could be increased from 4 months to 120 months (i.e., 10 years of completely satisfactory autonomous running without maintenance).

However, practical testing has shown that this theory is inapplicable; DC motors operating intermittently, e.g., as described above, prove to be subject to excessive wear, making them much less reliable than what is required, after a period of approximately 10–18 months. In practice, therefore, the coefficient of multiplication of maintenance-free life owing to intermittent operation is not the hoped-for 30, but rather only 3 or 4.

When the reasons for these unfavorable results were sought it was found that the wear and tear during intermittent service does not decrease in the expected proportion because it is greatly increased, especially as concerns the commutator and the brushes, when the motor is repeatedly turned on and off. It is a well-known fact that when a DC motor starts and stops, there are current values (upon starting) and inverse voltage values (upon stopping) which are very much greater than the values during normal running and which exert a particularly harmful action upon the commutation system (commutator and brushes). Theoretically, however, these exceptionally high values should occur only during an extremely short time, so that the excess wear attributable thereto should hardly amount to more than 10%.

In the first tests carried out, as well as in the rare intermittent drive arrangements utilizing a DC motor now in existence or previously proposed, the motor was switched on and off principally by electro-mechanical switch components. Yet no matter how well such electro-mechanical switching components are designed and constructed, they have proved to exhibit a certain amount of bouncing upon actuation and deactuation, thus considerably prolonging the excess current and voltage conditions which cause undue wear on the commutator and brushes. Hence wear and tear is increased, not by some 10–20%, but by some 100–200% or even more, which explains the unfavorable results obtained during the aforementioned tests.

Reference may be made to the graphs of FIGS. 1A and 1B the accompanying drawings for an illustration of how the phenomena causing excessive wear are multiplied by switching with electromechanical means.

On the other hand, besides the above-mentioned drawback of the prior art devices, it has never been proposed to produce such driving apparatus in such a way that the rate of intermittency can be easily adapted as has been mentioned. Of course, it is known to adjust the cadence of an intermittently functioning device, but the means therefor have always been relatively complicated.

SUMMARY OF THE INVENTION

It is an object of this invention to provide an intermittent drive arrangement which completely satisfies the essential requirement of very long autonomous life by meeting the conditions of both high efficiency and low wear and tear, and the essential requirement of high adaptability by simple means.

To this end, the drive arrangement according to the present invention, of the type initially mentioned, comprises a motor, an electronic switching circuit capable of initiating and cutting off the supply of electric power to this motor, preferably by non-electromechanical switching means, and switching-on control means for repetitively controlling this electronic switching circuit to cause it to initiate the power supply, the cutting-off at the same being determined as a function of a desired magnitude of a movement caused by the motor or by a kinematic chain driven by the motor, wherein said switching-on control means comprises a standard time pulse generator and at least one frequency-dividing circuit or counter, having a programmable counting cycle and exhibiting a plurality of setting connections, whereby the levels selectively applied to said connections determine, by combination, the counting cycle of said frequency-dividing circuit or counter, and thereby the intermittency rate of the repetitive operations of initiating said power supply.

Taking into account the structural particularities of a DC motor and also the supply voltage (and, if need be, the internal resistance of the power source), a DC motor will be capable of furnishing a certain maximum torque; and also having regard, if need be, to a certain kinematic multiplication or reduction, this torque will be sufficient to drive the associated apparatus even in the most unfavorable conditions. In all less unfavorable circumstances, when such a high torque is not necessary, the DC motor—this being one of its essential characteristics—will furnish a lesser torque and accelerate more, while limiting the consumption of electrical energy. Moreover, non-electromechanical switching components as will preferably be used will not be subject to bouncing and will therefore limit wear on the motor to the greatest possible extent, so that as concerns the life of the motor without any particular maintenance, virtually the entire benefit of the coefficient of actual running time relative to total time will be obtained. Laboratory tests have established that an arrangement of this kind remained free of prohibitive wear for a minimum of more than five years of intermittent operation with an actual running time of about 1/30 (or even less than 1/1000) of the total time.

As mentioned above, the switching-on control means comprise electronic time-counting means which periodically supply switching-on pulses to the electronic switching circuit, these time-counting means preferably being controlled by a quartz time standard. In order to provide great flexibility of use, the time-counting means is made programmable to supply such pulses at various rates, depending upon the type of apparatus to be driven.

In a particularly preferred embodiment, which presents the advantage of a very simple design ensuring the requisite high degree of reliability, the switching-off control means comprise a reed contact and at least one magnet disposed on the rotary component to act upon the reed contact at the end of the predetermined distance of rotation, the reed contact supplying a switching-off pulse to the electric switching circuit whenever the contact closes. In the simplest case, when there is only one magnet disposed on the rotary component, the predetermined distance of rotation will be one complete revolution. If the rotary component is mounted directly on the shaft of the motor, the motor will make exactly one complete revolution (disregarding possible non-cumulative minor irregularities) each time the switching-on control means cause the electronic switching circuit to initiate the power supply to the motor. If a step-up or step-down mechanism is installed between the motor shaft and the rotary component, the motor will make a fraction of a revolution or more than one revolution each time. The mechanical torque can be taken off the motor shaft or the shaft of the rotary component or off an intermediate gear between the two.

The multiplication or reduction ratio between the motor shaft and the shaft from which the mechanical torque is taken off will ensure, according to an inverse function, that the mechanical torque obtained is stepped-down or stepped-up relative to the torque furnished by the motor. Furthermore, the reduction or multiplication between the shaft from which the mechanical torque is taken off and the rotary component will supply a coefficient determining the number of revolutions or the fraction of a revolution which will be made by the shaft furnishing the mechanical torque during each period or powering the motor. A kinematic chain will preferably exist between the motor shaft and the rotary component, and the design will be such that the multiplication or reduction ratios can be easily modified so that the value of the mechanical torque furnished by the arrangement, as well as the unit of angular travel of the shaft furnishing such torque, can be established at will. Direct action is also possible.

Circuits supplying a predetermined output frequency, especially of 1 c/s, under the control of a quartz crystal are commercially available in the form of integrated circuits. In more general terms, such commercially available circuits supply one pulse per basic period of time of a predetermined value, e.g., half a second, 1 second, 2 seconds, etc., or one minute, one hour, twelve hours or one day. Devices of this kind are frequently used for powering apparatus which must advance one step at regular intervals, for instance, every minute or every 36 seconds (hundredth of an hour). This existing apparatus is designed to advance one step, for instance, when it has received 60 quanta of basic angular displacements. For controlling such apparatus, however, it is immaterial whether these 60 basic displacements take place in 60 stages or less than 60, even in only one, two, or three stages. Under these conditions, the number of starts is reduced, thereby further reducing wear and energy consumption as well.

BRIEF DESCRIPTION OF THE DRAWINGS

Other objects and advantages of the invention will become apparent from the following detailed description of two preferred embodiments thereof, taken in conjunction with the accompanying drawings, in which.

DESCRIPTION OF THE PREFERRED EMBODIMENTS

Figure 1A:
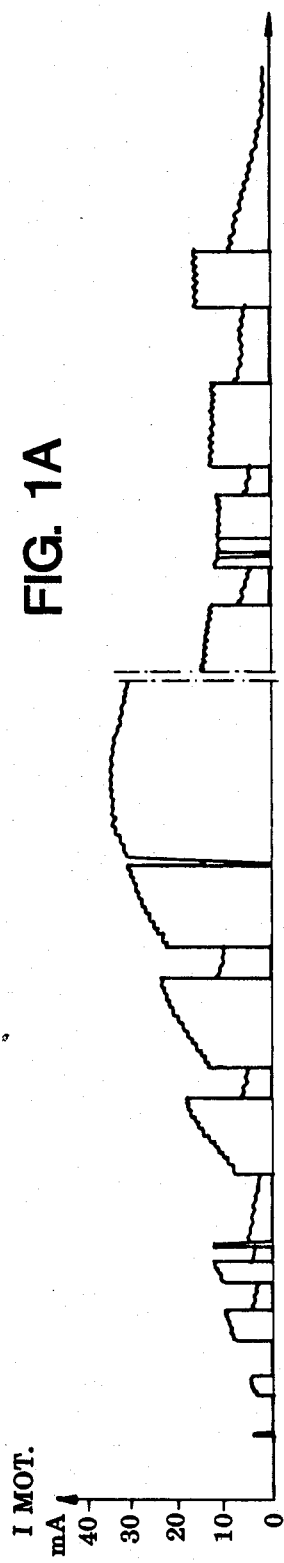
FIGS. 1A–1C are graphs showing as a function of time the conditions of initiating and cutting off the power supply of a DC motor when switching is done by a conventional electromechanical component (FIG. 1A), by a reed-type switch (FIG. 1B), and (FIG. 1C) by non-electromechanical switching means (typically transistors connected to the output of a flip-flop)
Figure 1B:
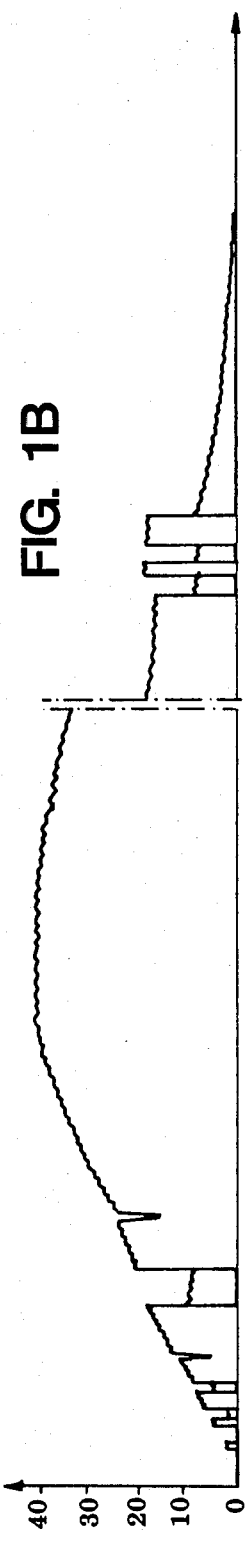
Figure 1C:
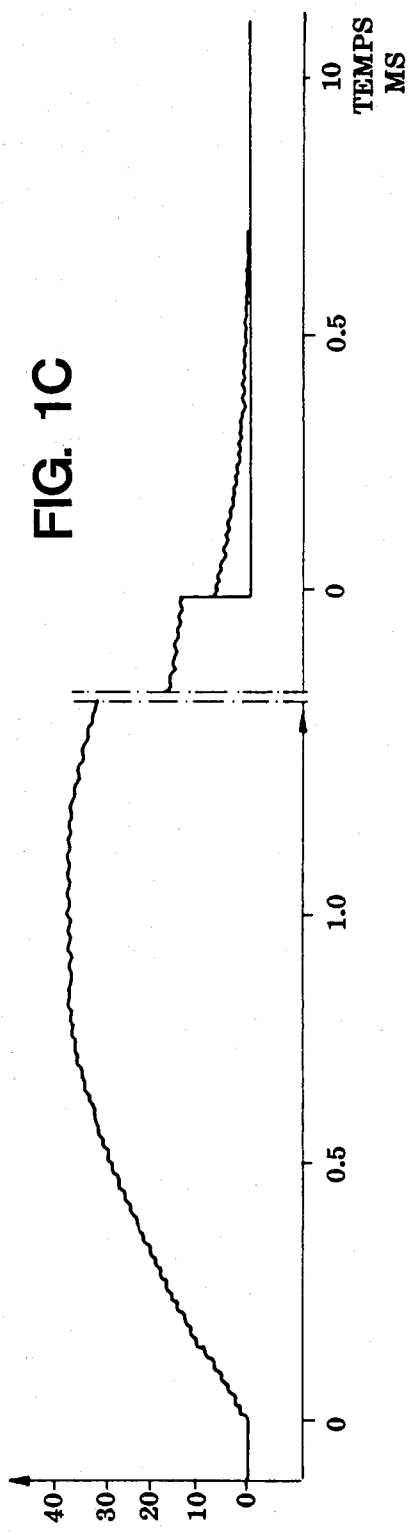

FIGS. 1A–1C show schematically the oscillograph curves of the current value in a DC motor to which an electric pulse is applied. FIG. 1A corresponds to the case in which the pulse is applied by means of a conventional electromechanical contact (relay), FIG. 1B to the case in which the pulse is applied by means of a reed-type contact, and FIG. 1C to the case in which the pulse is applied by purely electronic switching means, such as those shown in FIG. 2, for example. A large number of rebounds will be noted from FIG. 1A both when the current is switched on and when it is switched off. FIG. 1B shows an improvement in that application of the pulse by means of a reed relay still results in a few rebounds, but of lesser consequence. Finally, it will be seen from FIG. 1C that with purely electronic control means there is no bouncing at all.

It will also be noted that in the right-hand portions of the curves in FIGS. 1A–1C, corresponding to the end of the pulse, the currents are distinctly less high than in the left-hand portions; this is because at the end of the pulse, the motor is in motion and causes the occurrence of a counter-electromotive force which does not exist upon starting up. Furthermore, it will be observed that the curves are split in two at numerous locations, exhibiting a trace at the level of zero current and a trace at a higher current level. The trace at zero level corresponds to a situation where no diode is connected across the motor, so that the current cannot have a value other than zero at the moment when the contact which controls it is open. The higher trace, on the other hand, corresponds to a situation in which a diode is connected across the motor (as, for example, diode $D_2$ in the diagram of FIG. 2); in this case, the inductance of the motor can maintain a certain current at the moment when the contact, connected in series with the parallel mounting of the motor and the diode, is open.

The graphs in FIGS. 1A–1C correspond to the case of a small DC motor receiving pulses on the order of 2.5 V and, upon being switched on (but when not yet running), passing a current of approximately 40 mA which drops to a substantially lower value when the motor is in motion. In FIGS. 1A–1C, the duration of the pulse itself is not taken into consideration (it might be between 5 and 20 ms, for instance); on the other hand, the time scale is indicated for the transient phenomena of appearance and disappearance of the current. For example, it will be seen that when the current is switched on by means of a conventional electromechanical contact, bouncing occurs during a period of more than 1 ms. With other types of electromechanical contacts, this period could be even longer.

Trial runs and wear tests carried out by applying a very great number of pulses to the motor according to the three modes indicated above show that the rate of wear and tear on the most susceptible parts of the DC motor, i.e., the commutator and the brushes, is much higher when switching is accompanied by a great deal of bouncing (FIG. 1A) than when such switching is clean and free of bouncing (FIG. 1C).

Figure 2:
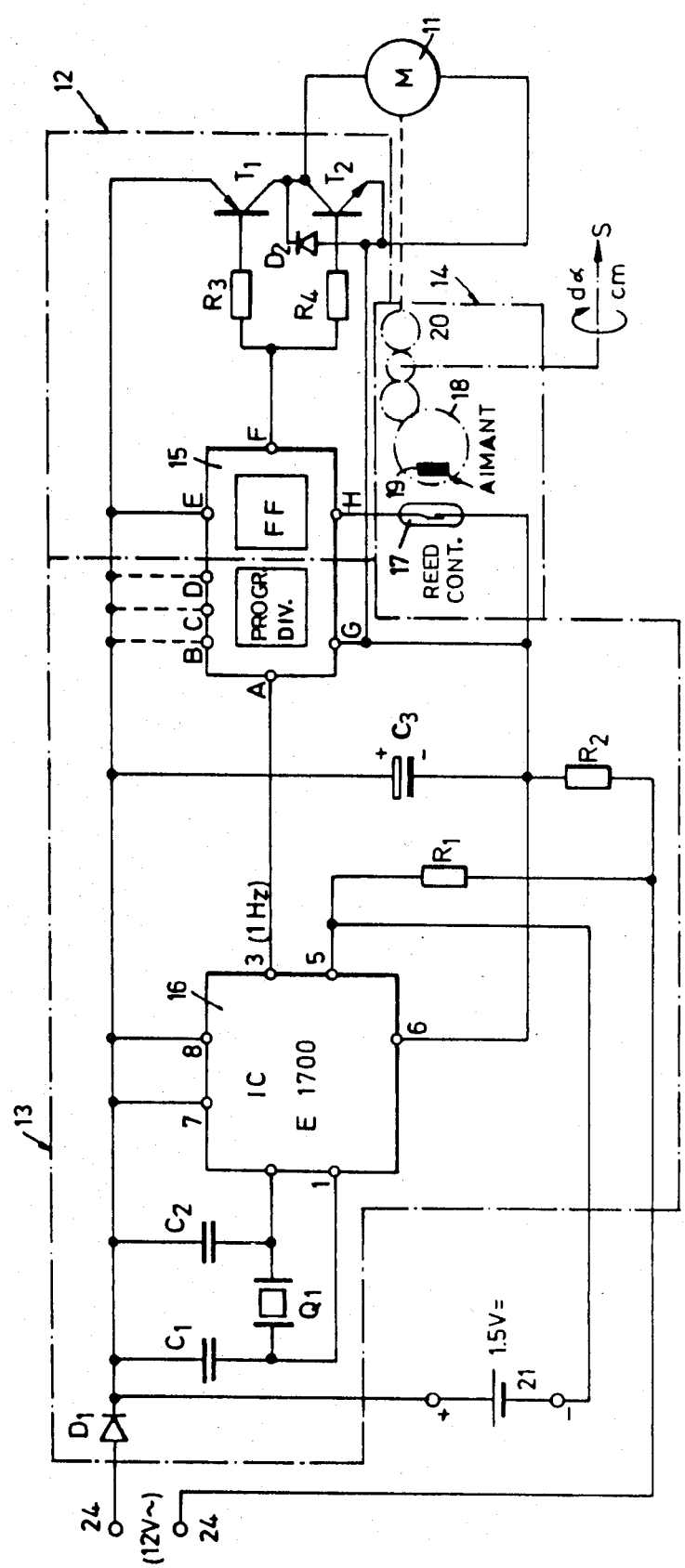
FIG. 2 is a diagram illustrating the composition and mode of operation of an embodiment of the arrangement according to the invention.

FIG. 2 shows a DC motor 11, typically operating at 1.5 V with a current consumption on the order of 20 mA during continuous operation when it furnishes an average torque equal to 40–60% of the maximum torque it is capable of furnishing. The operating conditions of motor 11 are approximately those shown in FIG. 1C.

The circuitry and devices provided for intermittently operating motor 11 comprise an electronic switching circuit 12, an electronic switching-on control circuit 13, and switching-off control means 14 including a reed contact 17. Circuits 12 and 13 and control means 14 are boxed within dot-dash lines in FIG. 2. Circuits 13 and 14 are connected by an integrated circuit 15, comprising a flip-flop and a programmable divider, one part of which is included in switching circuit 12 and the other part in switching-on control circuit 13.

A cell or storage battery 21 is connected to two inputs of circuit 13; furthermore, a 12-V AC feed input is provided between two terminals 24, likewise connected to circuit 13. The arrangement illustrated in FIG. 2, constituting a very particular embodiment of the proposed concept, can, in fact, be used in two different ways. In a first mode of operation, applicable when an AC source is available, the arrangement operates mainly by taking its power off AC inputs 24, and power store 21, which will then be a storage battery, is used solely as a standby in case there should be an AC power failure. At an average consumption of less than 1 mA (typically about 0.8 mA), a storage battery with a capacity of approximately 1.5 ampere-hours can provide a power reserve sufficient for more than one and a half months, certainly longer than any power failure which might occur.

The second mode of operation can be used when the arrangement is situated at a location where no AC power is available. In this case, input terminals 24 are not connected, and power source 21 will preferably be a cell or a group of cells. Since the arrangement is supposed to operate without maintenance for a number of years, typically five years or more, a cell is preferable to a storage battery because there is no known storage battery, not even of the heavy-duty type, which is capable of retaining its charge for more than a year.

On the other hand, highly reliable cells are available which have only a totally insignificant internal leakage current and which are capable of supplying power corresponding to the major part of their initial capacity in the form of a current on the order of 1 mA for at least five years. For example, a very long-life cell of very high dependability having a capacity of 50 ampere-hours might be used, or else a parallel-connected group, of cells of this type, each having a lower capacity but all together totalling approximately 50 ampere-hours. In this case, at a total discharge current (including the very small internal discharge of the cell) of slightly less than 1 mA, a completely autonomous operating life of approximately six years can be attained. The current consumption is calculated as follows: permanent consumption of the electronic circuits, 0.28 mA; integrated consumption of the motor (average pulse current about 20 mA, pulse ratio about 65), 0.32 mA; internal leakage current of the cell, 0.2 mA.

The embodiment being described proposes the supplying of cadenced pulses, i.e., pulses repeated at fixed intervals; however, it will be obvious that the proposed concept, the essence of which resides in DC motor 11, electronic switching circuit 12, and in its circuitry and control means (not necessarily those illustrated in FIG. 2), would be equally suitable for an arrangement supplying driving pulses at an arbitrary or random rhythm, depending upon a meteorological phenomenon, for instance.

In the present case, switching-on control circuit 13 is provided with an integrated circuit 16 of a commercially available type. Integrated circuit 16 is intended to operate with a 4 MHz quartz crystal $Q_1$ and to supply at its output 3 a frequency of 1 c/s, normally applicable to a stepping motor or to the control stage for a stepping motor. Two capacitors $C_1$ and $C_2$, the latter a variable capacitor, make it possible to adjust the frequency. The DC voltage source 21 (cell or storage battery, according to the mode of operation as explained above) is connected between a common point (connections 7 and 8 of integrated circuit 16) and an input 5 of circuit 16. The AC voltage, rectified by a diode $D_1$, is applied between the same common point and one end of a resistor $R_2$, the other end of which is connected to an input 6 of circuit 16. A capacitor $C_3$ filters the rectified voltage. This voltage is also applied, across a resistor $R_1$, to input 5 of circuit 16 for recharging the storage battery in the first mode of operation. In the second mode of operation, it would be preferable to disconnect capacitor $C_3$ if its leakage current is too great; it might be replaced by another capacitor of lower capacitance having no leakage current.

The foregoing describes the manner in which control pulses are produced at output 3 of integrated circuit 16 in switching-on control circuit 13 in one particular embodiment of the arrangement. However, any other method of producing control pulses at regular, arbitrary, or random intervals might equally well be used in operating the arrangement according to the proposed concept. These pulses, at 1 c/s in the present instance, are applied to an input A of integrated circuit 15 comprising the programmable frequency divider. Depending upon whether high or low voltage levels are present at three programming inputs B, C, and D of circuit 15, this divider operates with different dividing cycles and supplies pulses at different frequencies. Assuming that in response to a predetermined combination of high and low levels at inputs B, C, and D, the programmable divider transmits only the 1-c/s pulses (i.e., operates at a division ratio of 1), the flip-flop contained in circuit 15, but in the part thereof included in electronic switching circuit 12, receives a brief pulse each second. Since the flip-flop is of the RS type, this pulse actuates it, so that a low level appears at an output F of circuit 15, this output being an inverted output of the flip-flop. An inverter composed of a p-n-p transistor $T_1$ and an n-p-n transistor $T_2$ is controlled by output F via two resistors $R_3$ and $R_4$. When output F passes to the low level, transistor $T_1$ becomes conductive, whereas transistor $T_2$ is blocked. The positive voltage from the cell, the storage battery, or the rectifier (composed of diode $D_1$, resistor $R_2$, and capacitor $C_3$) is then conducted via transistor $T_1$ to one of the terminals of motor 11, the other terminal of which is connected to the negative pole of the power source. Motor 11 starts running and actuates a kinematic multiplication or reduction device 20 and, at the other end of the latter, a gear-wheel 18 bearing a small permanent magnet 19. When gear-wheel 18 is in a certain position, magnet 19 comes close to a reed contact 17 which then closes and applies the negative voltage to an input H of integrated circuit 15. As gear-wheel 18 rotates in response to the rotation of motor 11, magnet 19 moves away from reed contact 17, which thus opens. This does not change the state of the flip-flop, however, for circuit 15 is arranged so that the flip-flop is controlled by the return of the negative potential to input H. When gear-wheel 18 has completed one revolution, magnet 19 returns to the vicinity of reed contact 17, which closes again, and the negative potential is reapplied to input H of circuit 15. This voltage jump causes the flip-flop to be reset and thus causes output F of circuit 15 to pass to the high logic level, i.e., to the level of the positive feed voltage. Hence transistor $T_1$ is blocked, whereas transistor $T_2$ becomes conductive. Motor 11 is no longer powered by the positive voltage, and in addition it is short-circuited by conductive transistor T₂. Furthermore, a diode D₂ is connected across motor 11 and across the emitter-to-collector path of transistor T₂ to prevent a voltage of reversed polarity from developing at the terminals of motor 11 when the current is cut off, for because of the inductance of the motor, the current tends to be sustained with a polarity other than that in which transistor T₂ is conductive.

It will be readily understood that by the action of kinematic multiplication-reduction mechanism 20, one revolution of gear-wheel 18 corresponds to an arbitrarily selected angular displacement (less than, equal to, or more than one revolution) of the shaft of DC motor 11. The output torque of the arrangement, intended to drive an apparatus, may be taken off the shaft of motor 11, off an intermediate gear of kinematic multiplication-reduction mechanism 20, or off the shaft of gear-wheel 18. It will be understood that the step-up or step-down ratio between the shaft of motor 11 and that of the gear from which the mechanical torque is taken off makes it possible to determine the maximum output torque which will be present at the output S of the arrangement. Moreover, the step-up ratio between the gear from which the mechanical output torque is taken off and gear-wheel 18 makes it possible to determine the angular displacement (whole or fractional number of revolutions) which will be effected each time by the output shaft of the arrangement. Thus, the desired mechanical torque mt and the amount of each single angular displacement can be selected for this shaft.

Since transistors T₁ and T₂ are controlled by the output of a flip-flop, their switching will always be absolutely clean, free of any bouncing. Under these conditions, the small DC motor 11 can operate without needing maintenance for a very long period which can extend to at least five or six years, or even 10 years, the ratio of actual operating time of the motor to the total time elapsed being on the order of 1:60, for example.

An intermittent drive arrangement of the kind illustrated in FIG. 2 can be used to advantage for controlling a time indicator (e.g., one having flipping panels) or a time-printing roller (e.g., in a cancelling or stamping apparatus). Existing equipment of this type is generally designed to receive pulses for mechanical advancing at the rate of one per second and comprises an inner mechanism causing it to flip the panels once per minute or to index the roller once per minute or once every 36 seconds (marking a hundredth of an hour). In this case, it does not matter whether the 60 mechanical pulses are supplied uniformly and separately or in one or more blocks. It is here that the programmable divider comprised in integrated circuit 15 plays an advantageous part. By means of a combination of suitable levels at inputs B, C, and D of circuit 15, for example, the programmable divider can be caused to operate according to a cycle of 12. The flip-flop of circuit 15 will then receive an actuating pulse every 12 seconds. Accordingly, the step-up or step-down ratio between gear-wheel 18 and the gear furnishing the mechanical torque at output S will be such that for each revolution of gear-wheel 18, the output gear will effect an angular displacement equal to 12 times that corresponding to one driving step of the apparatus to be controlled. Hence this apparatus, instead of receiving 60 mechanical advances, will receive only 5, but with each being 12 times as long; or instead of receiving 36 advances, it will receive only 3, but with each being 12 times as long.

It should be noted that the same result could be obtained without acting upon the kinematic multiplication-reduction mechanism 20 by interposing a counter-divider between reed contact 17 and input H of the flip-flop of circuit 15.

In another modification, it would be possible to use the same programmable divider already comprised in integrated circuit 15, the latter counting forward in response to the pulses at input A and backward in response to the pulses at input H, and the flip-flop being actuated when the counter reaches the count of 12 and returning to the rest state when the counter returns to zero. In this case, means would have to be provided for avoiding any interference between the two types of pulses; this would be automatically accomplished insofar as gear-wheel 18 completes its 12 revolutions in less than one second.

The kinematic means linking the shaft of motor 11 to magnet 19 may be designed in various ways. The step-down or step-up means may be of different types (gearing, chains, etc.) to produce either a reduction or an amplification of the motion, this being a question of choice and of adaptation to the conditions of the apparatus to be driven. It would also be possible to dispose several magnets 19 at uniform angular spacing on rotary component 18.

The advantage of grouping the pulses into a single, longer mechanical pulse consists in even further reduced wear and tear on the DC motor, as well as in an even greater saving on energy, since the number of starts and stops is decreased in proportion to the pulse-grouping factor.

The selection of a grouping of 12 pulse-seconds will provide an arrangement capable of controlling both a minute-counter and a hundredth-hour-counter by means of mechanical pulses occurring every 12 seconds.

The arrangement according to the present invention might very well be used to drive flap-type indicators other than those used for giving the time, e.g., those used for indicating destinations in railroad stations and airports. In this case, switching-on control circuit 13 could be a circuit comprising a calculator to process a suitable number of pulses automatically, taking into account the position of the flap to be displayed. These pulses could be applied at any suitable speed, regularly or irregularly, independent of any considerations of time measurement or indication.

Finally, it will be obvious that during cadenced operation, the basic time period may quite well be other than a second and may even bear an irrational relationship to a one-second period. In the example described above, the basic time period was one second, and the ratio of the time interval for operation of the driven apparatus to the basic period was either 60 or 36. The pulse-grouping factor was 12. In the case of a minute-counter or -indicator, all the factors of 60, viz., 2, 3, 4, 5, 6, 10, 12, 15, 20, and 30, could be used. However, a pulse-grouping factor on the order of 10 to 15 proves suitable from the point of view of saving on both wear and tear and energy consumption.

Figure 3:
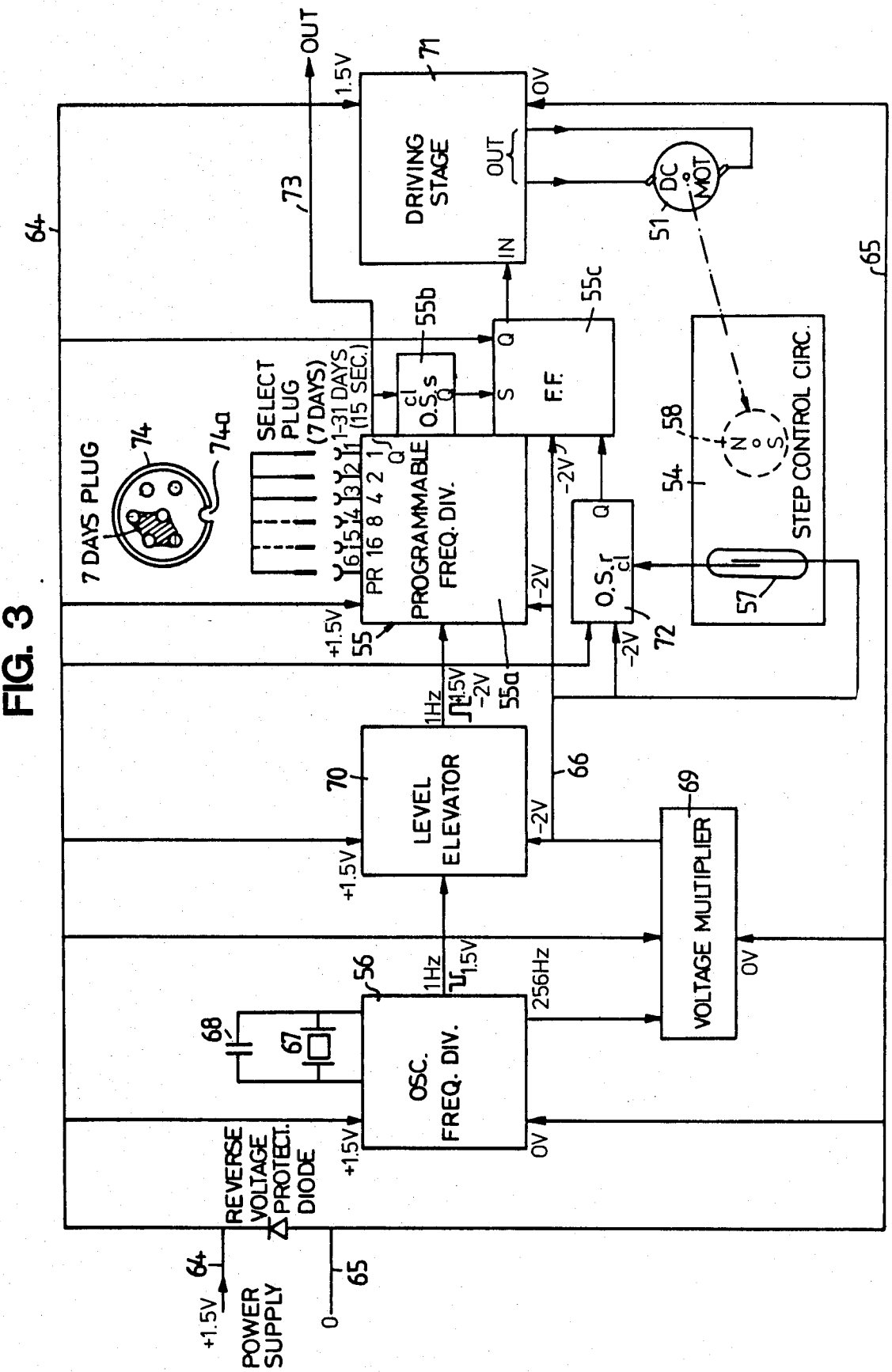
FIG. 3 is a diagram illustrating the composition and mode of operation of another embodiment of the arrangement according to the invention.

FIG. 3 shows an intermittent control arrangement in another embodiment of the invention. This arrangement, or circuit assembly, comprises an oscillation and frequency-division circuit 56, the basic frequency of which is controlled by a quartz crystal 67 and adjusted by a capacitor 68.

The circuit 56 supplies a square output signal of 1 c/s with a difference of 1.5 V between the high and low levels.

Unlike the embodiment previously described, this further embodiment is intended to be powered by a DC source at two inputs, viz., input 64 carrying the positive voltage of +1.5 V and input 65 carrying the negative voltage, here designated as "0".

The frequency divider therefore supplies a serrated signal of 1.5 V at 1 c/s. It further supplies a signal at 256 c/s to a voltage multiplier 69 which, powered by 1.5 V and receiving a frequency of 256 c/s, supplies a supplementary voltage of −2 V over a line 66. Thus, part of the arrangement can operate at a higher voltage, between +1.5 V and −2 V, i.e., at a voltage of 3.5. V.

The signal leaving oscillator and frequency-divider circuit 56 is first applied to the input of a level elevator 70 which, receiving the −2 V as negative voltage and the +1.5 V as positive voltage, is capable of supplying at its output a square signal at 1 c/s having a high level of +1.5 V and a low level of −2 V.

This 1 c/s signal, but at increased serrated voltage, triggers a programmable divider 55a which, together with a one-shot multi-vibrator 55b and a flip-flop 55c, forms a unit 55 corresponding, except for a few details, to circuit 15 of the embodiment previously described. Programmable divider 55a starts by dividing the 1 c/s frequency at its input by 86,400 so as to supply one pulse per day. This division by 86,400 is carried out in a conventional manner by means of three successive frequency divisions, the first by 60, the second by 60, and the third by 24. In this particular case, it is preferable to effect a first division by 15, then a division by 64, then a division by 9. This procedure presents the advantage that at least one of the three divisors functions according to a cycle equal to a power of two, whereas the other two divisors function conventionally to effect a division by a number other than a power of two. A further advantage is that a period of 15 seconds is supplied, which, combined with signals of suitable frequencies supplied by the following stages, makes it possible to obtain a daily pulse of 15 seconds' duration in programmable divider 55a.

Divider 55a also contains counter means by means of which it is possible to effect a frequency division by any number from 1 through 31 at will. Five input terminals "1", "2", "3", "4", and "5" allow this selection, so that the period of the signal leaving output Q of divider 55a can be fixed at one day, two days, and so on, up to thirty or thirty-one days, as may be desired.

The embodiment illustrated in FIG. 3 presents a highly advantageous structural arrangement for setting this number of days, to be described below.

Programmable frequency divider 55a supplies a 15-second output signal which, as explained, may appear every day, every other day, once a week, etc. This signal is applied to the first one-shot setting multivibrator 55b, output Q of which supplies a brief pulse whatever the duration of the pulse applied at its input cl may be. This brief pulse acts upon the setting input of flip-flop 55c, output Q of which passes to a high level (+1.5 V) when a pulse is applied to its input.

Furthermore, the 15-second signal occurring every day, every other day, once a week, etc., as desired, is supplied over an output line 73 (OUT) to be used, as need be, for controlling auxiliary apparatus.

Output Q of flip-flop 55c is applied to the input of a driving stage 71 powered by the input supply voltage (+1.5 V, 0 V) and supplying, when controlled at its input (IN), an operating voltage to a DC motor 51. This is highly analogous to the situation with respect to motor 11 in the first embodiment.

Motor 51 actuates various mechanical elements (not shown) and also, either directly or via a step-up or step-down kinematic chain, a magnetized wheel 58 in a step control circuit 54. This circuit comprises a reed contact 57 analogous to reed contact 17 of the first embodiment. When wheel 58 has made a complete revolution or half a revolution, as the case may be, reed contact 57 closes and acts upon a one-shot resetting multivibrator 72 which is powered by both voltages, +1.5 V and −2 V, and supplies a brief pulse at its output Q when triggered at its input cl. This brief pulse is applied to the resetting input R of flip-flop 55c which then flips in the other direction and puts its output Q back to the low level so that driving stage 71 ceases to power motor 51.

Except for one-shot multivibrator 72, and considering the three elements 55a, 55b, and 55c as a whole, 55, the circuitry described above is substantially equivalent to the motor-control circuitry described in connection with FIG. 2 in the first embodiment.

The embodiment illustrated in FIG. 3 is intended particularly as an intermittent drive arrangement in installations requiring a rate of intermittency selectable at will between one and thirty-one days and capable of being changed subsequently. Such requirements are frequently to be found in recording apparatus such as are increasingly often installed in distribution networks of all kinds, e.g., oil, superheated fluid, gas, etc.

Terminals "1" through "5" of programmable frequency divider 55a correspond to periods of one, two, four, eight, and sixteen days, respectively. By combining these periods, it is possible to arrive at any total number of days between one and thirty-one. A sixth terminal PR serves as a common junction for terminals "1" through "5".

FIG. 3 illustrates the situation where a rate of intermittency of seven days has been selected. This total is reached by adding the periods of one, two, and four days, i.e., a connection is to be established between terminal "6" and each of the terminals "1", "2", and "3".

If the intermittency rate is specified when the apparatus is ordered, it can be set prior to delivery. On the other hand, it may be necessary to change the rate when the apparatus is already in use.

For both these operations, i.e., for setting the rate desired by the purchaser beforehand as well as for subsequent modification of the rate of an installation in operation, a particularly advantageous plug-and-socket system has been provided. The six terminals of programmable divider 55a are disposed on a socket 74 having in the middle a hole corresponding to terminal 6 and, distributed around this hole at about 50-55 degrees of angle from one another, five holes corresponding to terminals "1" to "5", respectively. These holes are provided with internal contacts, and a plug is plugged in by means of its pins for the purpose of setting the desired number of days. Socket 74 includes a notch 74a as a positioning aid.

Figure 4A:
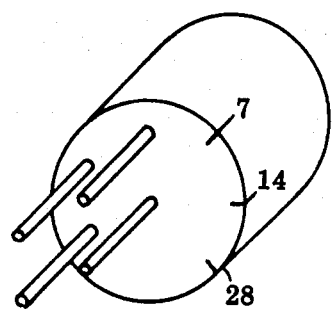
FIGS. 4A–4C are perspective views of three different plugs used to adapt very simply the rate of intermittency of driving in the embodiment according to FIG. 3.

Three examples of plugs are shown in FIG. 4. The one depicted in FIG. 4A comprises three peripheral pins connected to the center pin. This plug can be plugged in as shown in FIG. 3 to establish a connection between the three terminals corresponding to periods of one, two, and four days, giving a rate of seven days. By rotating it one step, the three periods of two, four, and eight days will be combined to yield a total of 14 days; by rotating it one more step, the three periods of four, eight, and sixteen days will be combined to yield a total of 28 days.

Figure 4B:
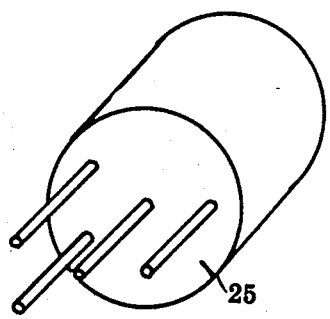

FIG. 4B shows a plug which can be used only for a setting of 25 days, for it connects the center pin and the pins for the terminals corresponding to periods of one, eight, and sixteen days, thus totalling 25 days. This plug cannot be used in any other position.

Figure 4C:
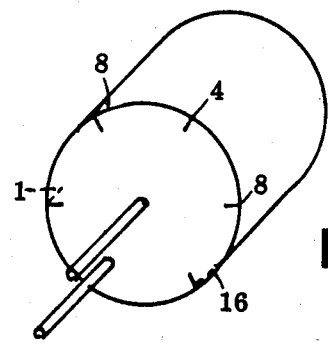

Finally, FIG. 4C illustrates a plug which establishes only a single connection between the center pin and the peripheral locations, i.e., this plug can be used to set a rate of one day, two days, four days, eight days, or sixteen days, depending upon how it is positioned relative to notch 74a. Matching numbers are inscribed at the edge of each plug at the location intended to face notch 74a so that the number of days to which a multiple-position plug such as that shown in FIG. 4C is set becomes immediately apparent.

It will be readily understood that in order to be able to select any number of days from one through thirty-one, only sixteen plugs are needed, viz., one for rates of 1, 2, 4, 8, or 16 days (shown in FIG. 4C); one for rates of 3, 6, 12, or 24 days (not shown); one for rates of 5, 10, or 20 days (not shown); one for rates of 7, 14, or 28 days (shown in FIG. 4A); four for rates of 9 or 18, 11 or 22, 13 or 26, and 15 or 30 days, respectively (not shown); and eight for only one rate each, i.e., 17, 19, 21, 23, 25, 27, 29, and 31, respectively (not shown except for the plug depicted in FIG. 4B used for a 25-day rate).

Thus, a maintenance employee responsible for overhauling or checking the installation may very well take along a set of plugs and change (or simply rotate) one or more of them to alter the rate from, say, one pulse per week to one pulse every two weeks. Another advantage of this system is that only one single design need be produced for any desired rate between one and thirty-one days, using the proper plugs for that rate in each case according to the purchaser's order. If need be, a device for affixing a seal may be provided so that unauthorized persons are prevented from changing the plugs.

In practice, the requirement will be chiefly for rates of one pulse every one, two or three days, one pulse per week, one pulse every two weeks or four weeks, and possibly one pulse every thirty or thirty-one days. Hence a set of five plugs may be considered sufficient. The plugs for unusual periods of time, such as 23 days, for example, will be very rarely used and need hardly be kept on hand.

It should be noted that in the embodiment illustrated in FIG. 3, the motor might equally well be of a different type, e.g., a stepping motor. Furthermore, the power supply might also be different, and the voltage multiplier and level elevator dispensed with. It would likewise be possible to provide for mains power as in the case of the embodiment according to FIG. 2.

Moreover, it should be noted in connection with the embodiment of FIG. 3 that the advantages mentioned in connection with the embodiment of FIG. 2 apply here as well: the use of a DC-motor driven totally electronically ensures very low wear and tear and very long periods during which no servicing is required.

What is claimed is:

1. An arrangement for intermittently driving a monitoring apparatus operative without maintenance over an extended period of time to record data during widely spaced intervals of time, said arrangement comprising a DC motor having a shaft which drives said monitoring apparatus, the amount of torque required to drive said apparatus being variable, a DC power source, an electronic switching circuit disposed between said power source and said DC motor for selectively connecting said source to said motor and for selectively disconnecting said source from said motor, said switching circuit being free of electrical contacts that exhibit bounce during said connecting and disconnecting operations, switching-on control means coupled to said switching circuit for repetitively causing said electronic switching circuit to connect said power source to said DC motor thereby to energize said motor, and switching-off control means coupled to said switching circuit and responsive to movement of the shaft of said DC motor, after said motor has been energized, for disconnecting said power source from said motor as a function of a predetermined magnitude of movement of the shaft of the motor, said connecting and disconnecting operations being effected repetitively with said power source being connected to said DC motor for time intervals that are small in comparison with the time intervals that said power source is disconnected from said motor, said DC motor operating to automatically adapt its power consumption during said small time intervals to the torque required to drive said apparatus, said switching-on control means comprising a standard time pulse generator coupled to at least one frequency-dividing circuit having a programmable counting cycle, said frequency-dividing circuit including a plurality of setting connections which are adapted to be actuated in selected different, readily changeable combinations to change said counting cycle of said frequency-dividing circuit to a selected counting cycle within a range of counting cycles, the ratio of the maximum and minimum counting cycles within said range being at least 12 to 1, whereby said setting connections are adapted to permit ready selection and change of the intermittency rate of the repetitive connecting of said power source to said DC motor to a desired rate within a wide range of possible rates.

2. The arrangement of claim 1, wherein said pulse generator in said switching-on control means comprises a crystal controlled oscillator.

3. The arrangement of claim 1 wherein said plurality of setting connections comprises three setting connections.

4. The arrangement of claim 1 intended to drive said motor at the rate of once per unit of time selected from the range of one day to thirty-one days, wherein said plurality of setting connections comprises five setting connections respectively corresponding to periods of one day, two days, four days, eight days, and sixteen days for composing the desired number of days by adding said periods corresponding to selected ones of said connections 5. The arrangement of claim 4, comprising a plug-and-socket system, wherein said setting connections are five electrical contact holes concentrically disposed about a sixth hole in a socket, for co-operating with a selected one of a plurality of plugs, each intended to connecting said sixth hole to selected ones of said five holes in order to produce the total of said periods.

6. The arrangement of claim 5, wherein some of said plugs can be fitted into certain of said electrical connecting holes in different positions, thus giving different numbers of days, such that sixteen different plugs enable the selection of each of the thirty-one different possibilities of number of days.

7. A device for intermittently driving an apparatus at a rate of once per unit of time selected from the range of one day to thirty-one days, said device comprising a motor having a shaft which drives the apparatus, a power source, an electronic switching circuit disposed between said source and said motor for selectively connecting said source to and disconnecting said source from said motor, said switching circuit being free of mechanical and electromechanical components capable of exhibiting bounce during said connecting and disconnecting operations, first control means coupled to said switching circuit for repetitively causing said electronic switching circuit to connect said power source to said motor, and second control means coupled to said switching circuit and responsive to rotation of the shaft of said motor through a predetermined angle for subsequently causing said electronic switching circuit to disconnect said power source from said motor, said first control means comprising a standard time pulse generator coupled to a programmable frequency-dividing circuit, said frequency-dividing circuit including five setting connections which correspond respectively to time intervals of one day, two days, four days, eight days, and sixteen days, said five setting connections being actuable individually and in selected different additive time interval combinations to change the counting cycle of said frequency-dividing circuit to a selected counting cycle within the range of one to thirty-one days.

8. The device of claim 7 wherein said five setting connections are five electrical contact holes concentrically disposed about a sixth electrical contact hole in a socket, and a plug adapted to be inserted into the contact holes in said socket, said plug including one contact element for insertion into said sixth hole and at least one other contact element for insertion into at least one other of said contact holes to electrically connect said sixth contact hole to the others of the holes in said socket into which contact elements are inserted thereby to cause said frequency-dividing circuit to exhibit a counting cycle which is the total of the time intervals represented by said others of said holes.

9. The device of claim 8 wherein a plurality of said plugs are provided, different ones of said plugs having different arrangements of contact elements thereon to permit a change in the number of days in a counting cycle by changing the plug which is inserted into said socket, at least one of said plugs being configured to be insertable into said electrical contact holes in different positions whereby the same plug can be used to effect counting cycles having different numbers of days.

* * * * *